June 6, 1950  J. J. DANTE  2,510,308
ELECTRIC CIGAR LIGHTER
Filed Jan. 19, 1949  2 Sheets-Sheet 1

INVENTOR.
JOSEPH J. DANTE
BY
H. G. Manning

June 6, 1950 J. J. DANTE 2,510,308
ELECTRIC CIGAR LIGHTER
Filed Jan. 19, 1949 2 Sheets-Sheet 2

INVENTOR.
JOSEPH J. DANTE
BY
H. G. Manning

Patented June 6, 1950

2,510,308

UNITED STATES PATENT OFFICE 2,510,308

ELECTRIC CIGAR LIGHTER

Joseph J. Dante, Bantam, Conn.

Application January 19, 1949, Serial No. 71,567

9 Claims. (Cl. 219—32)

This invention relates to cigar and cigarette lighters and more particularly to a portable lighter having a heating unit of the electrical resistance type.

One object of this invention is to provide a lighter of the above nature in which the heating unit has a smooth, continuous surface coating which is adapted to be uniformly heated by the passage of an electric current therethrough so that the user may readily ignite the end surface of a cigar or cigarette.

Another object is to provide a lighter of the above nature in which the heating unit normally is completely disconnected from both conductors of the electric supply circuit, thus avoiding possible accidents.

Another object is to provide a lighter of the above nature which will have no crevices likely to collect dust or dirt.

Another object is to provide a compact, safe, and economical mechanism for controlling and supporting the heating unit in an outer casing or body.

A further object is to provide a lighter of the above nature which will be simple in construction, inexpensive to manufacture, easy to use and manipulate, compact, ornamental in appearance, and very efficient and durable in use.

With these and other objects in view, there has been illustrated on the accompanying drawing one form in which the invention may conveniently be embodied in practice.

Figure 1:
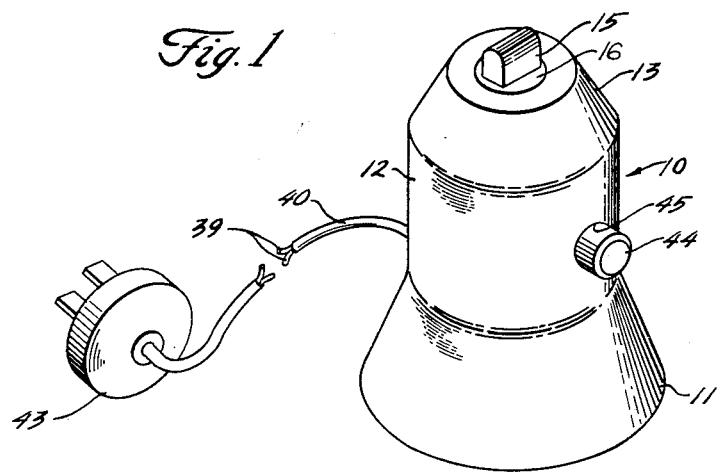
Fig. 1 is a perspective view of the improved cigar lighter and current supply cord and plug.
Figure 2:
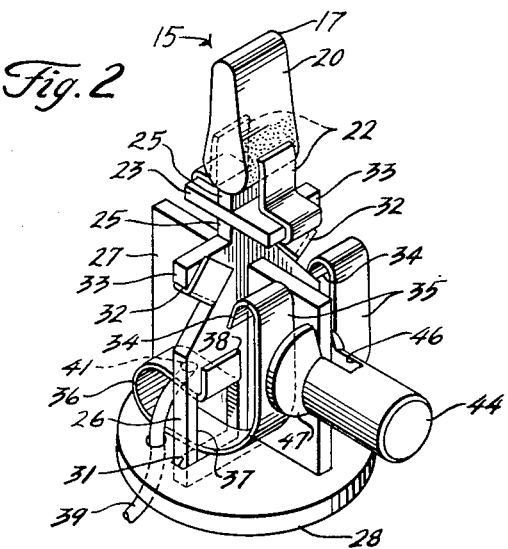
Fig. 2 is a perspective view showing the interior of the lighter mechanism as it would appear with the outer casing and the heating unit insulator removed.
Figure 3:
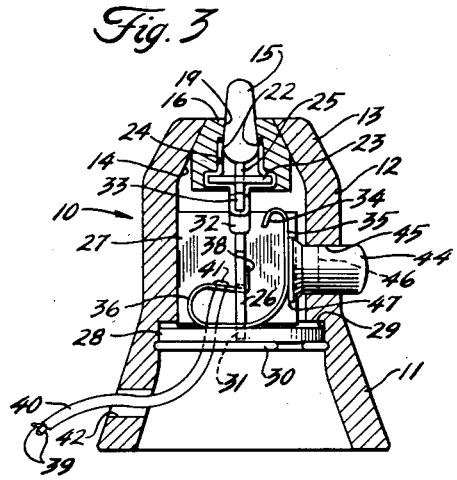
Fig. 3 is a longitudinal sectional view of the lighter.
Figure 4:
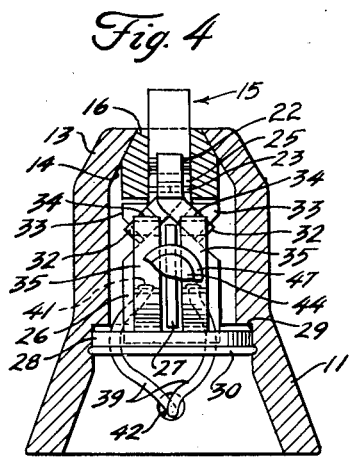
Fig. 4 is a longitudinal sectional view similar to Fig. 3, but taken at right angles thereto.
Figure 5:
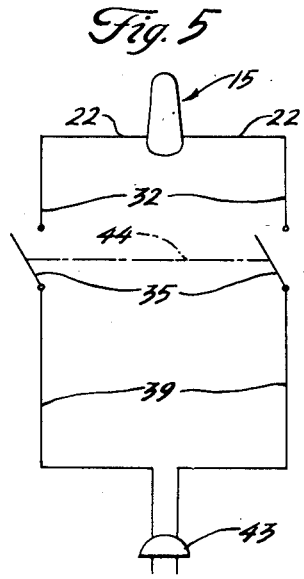
Fig. 5 is a diagram showing the electric circuit of the lighter.
Figure 6:
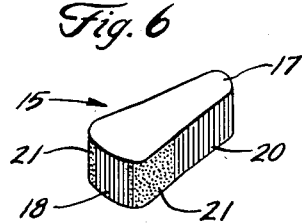
Fig. 6 is a perspective view of the heating unit on an enlarged scale.

Referring now to the drawings, in which like reference numerals denote corresponding parts throughout the several views, the numeral 10 indicates a hollow outer casing or body, which is preferably molded from a suitable insulating plastic material and comprises a flared base portion 11, an intermediate cylindrical portion 12, and an upper inwardly-inclined flanged portion 13 having an inner frusto-conical surface 14.

Provision is made of a tapered heating unit 15 having a core of ceramic porcelain which is held in a centered position in the upper end of the casing 10 by means of a hollow bevelled porcelain insulator 16 which is seated against the inner frusto-conical surface 14, in a position substantially flush with the upper end of the casing 10.

The heating unit 15 is rectangular in cross section and is tapered to provide a relatively small rounded upper end 17, and an enlarged lower end 18, so that when said heating unit 15 is firmly seated in a central tapered aperture 19 in the insulator 16, said unit will project a substantial distance above the insulator 16 and casing 10.

The upwardly convergent sides and the upper end 17 of the heating unit 15 are provided with a thin coating 20 which is of carbon resistor material baked on said unit, and which is of a suitable uniform width and thickness over the upper portion of said unit to provide the desired heating effect when subjected to the voltage at which the lighter is intended to be used.

It will be understood that the coating 20 is continuous over the sides and top of the heating unit 15, and terminates upon the side surfaces of the enlarged lower end 18 so that the electric current passing through said coating will not be short-circuited across the bottom of the unit.

In order to electrically connect the carbonized coating 20 to both sides of a source of current supply, a pair of conductive cadmium coatings 21 are preferably applied over the terminal portions of the coating 20 at the enlarged lower end 18 of the unit 15, as by electroplating, for providing a good electrical contact with a pair of reversely bent upstanding spring clips 22 which are adapted to engage and grip the opposite sides of said lower end 18.

The spring clips 22 are clamped upon opposite ends of a horizontal rectangular insulating clip support 23—the lower end of the insulator 16 being provided with a conforming stepped recess 24 for receiving the clip support 23 and the clips 22 thereon. The horizontal clip support 23 is held in position by means of the reduced upper end 25 of a flat vertical wall member 26 which is vertically slotted so as to receive a flat rectangular cross piece 27.

The central portions of the clip support 23 and the reduced upper end 25 of the wall member 26 are oppositely slotted, whereby said clip support 23 and reduced end 25 are interengaged and firmly held in mutually perpendicular relation.

Thus, the wall member 26 not only maintains the clip support 23 and the spring clips 22 within the stepped recesses 24, but also holds the insulator 16 firmly against the inner surface 14 of the upper flange 13 of the casing 10. Further, it will be seen that the reduced upper end 25 of the wall member 26 engages the lower end of the heating unit 16, whereby said unit is firmly supported in the insulator 16.

The vertical wall member 26 is held in place by means of a bottom supporting disk 28 upon which the cross piece 27 rests, said supporting disk being retained in an inner circular recess 29 in the casing 10, adjacent the upper end of the base portion 11, by means of a resilient compressible wire retainer ring 30. The lower end of the vertical wall member 26 is received in a transverse slot 31 in the supporting disk 28, so that said wall member will be maintained positively in a diametrical position within the casing 10.

As a provision for supplying electric current to the respective spring clips 22, the lower ends of said clips are formed with integral U-shaped lugs 32 which are inclined outwardly at approximately 45 degrees so as to embrace a pair of opposite ears 33 integral with the upper side portions of the vertical wall member 26.

While the spring clips 22 are of identical shape, it will be seen that said clips are reversed in position, being applied to opposite ends of the clip support 23, thus disposing the U-shaped lugs 32 at the lower ends of said clips at opposite sides of the vertical cross piece 27, so that said lugs are adapted to serve as contacts for engagement by inwardly-curved upper ends 34 of a pair of vertical contact arms 35. The contact arms 35 are formed of resilient strip metal such as spring bronze, and are curved rearwardly at their lower ends into U-shaped bases 36, which are held in rectangular apertures 37, 37, in the vertical wall member 26 at opposite sides of the cross piece 27. The U-shaped bases 36 abut the upper surface of the supporting disk 28 and terminate upwardly in end lugs 38, 38 which engage the upper walls of the rectangular apertures 37, so that the vertical contact arms 35 will be supported firmly in their proper operating position.

As a provision for connecting the vertical contact arms 35 to a source of current, the respective conductors 39 of a two-conductor electric cord 40 are passed upwardly through apertures in the supporting disk 28 at each side of the cross piece 27, and are connected to the upper arms of the U-shaped bases 36 by solder as shown at 41. The electric cord 40 extends outwardly through an aperture 42 in the base portion 11 of the casing 10, and is provided at its outer end with a two-pronged attachment plug 43.

The vertical contact arms 35 are adapted to be operated by means of a push button 44 which is slidable in a radial aperture 45 in the cylindrical portion 12 of the casing, said push button having a vertical slot 46 in its inner end, which embraces an edge portion of the cross piece 27, so that said push button may operatively engage the vertical contact arms 35 at opposite sides of the cross piece 27.

It will be understood that the inner end of the push button 44 is engaged by and normally pressed outwardly by the vertical contact arms 35, so that said push button will normally be in an outward position in which the curved upper ends 34 of said arms are disengaged from the U-shaped lugs 32 of the spring clips 22.

In order to limit the outward movement of said push button and prevent its separation from the casing 10, a peripheral flange 47 is provided upon the inner end of the push button 44.

Operation

In operation, the improved cigar lighter may be prepared for use merely by connecting the attachment plug 43 to any suitable source of A. C. or D. C. electric current.

When it is desired to use the lighter, it will merely be necessary to press the push button 44 inwardly so as to engage the curved upper ends 34 of the contact arms 35 with the lugs 32.

This will energize the heating unit 15 so that the carbonized conductive coating 20 thereon will be uniformly heated to a sufficient degree to ignite the end of a cigar or cigarette which is pressed thereagainst. After the cigar or cigarette has become ignited, the push button 44 will, of course, be released, thus permitting the contact arms 35 to spring outwardly, so that the heating unit 15 will be completely disconnected from both of the conductors 39.

It has been found that under normal usage, the life of the heating unit 15 may be approximately five years. When the heating unit 15 fails for any reason, it may be easily replaced merely by prying out the retainer ring 30 and removing the entire interior mechanism of the lighter through the bottom of the casing 10.

A new heating unit 15 may readily be inserted between the upper ends of the spring clips 22, whereupon the lighter mechanism may be easily reinserted in the casing 10, and the retainer ring 30 replaced.

While there has been disclosed in this specification one form in which the invention may be embodied, it is to be understood that this form is shown for the purpose of illustration only, and that the invention is not to be limited to the specific disclosure, but may be modified and embodied in various other forms without departing from its spirit. In short, the invention includes all the modifications and embodiments coming within the scope of the following claims.

Having thus fully described the invention, what is claimed as new, and for which it is desired to secure Letters Patent, is:

1. In an electric cigar lighter, a heating unit comprising a block of heat-resistant insulating material and a coating of electrically resistive and conductive material extending over an upper portion of said block, said coating terminating on opposite lower side portions of said block, and means for holding said heating unit comprising an apertured insulator embracing a mid-portion of said block and a pair of electrically conductive spring clips insulated from each other and gripping said block upon the end portions of said coating, whereby said unit may be heated by an electric current applied through said clips.

2. The invention as defined in claim 1, wherein said coating has a central portion of uniform length, width and thickness between said clips, whereby a uniform heating effect will be produced in said central portion by an electric current flowing therethrough, the end portions of said coating comprising outer metallic layers providing efficient electrical contact with said clips.

3. The invention as defined in claim 1, in combination with a pair of resilient contact arms normally disengaged from said clips, means for pressing said arms simultaneously into engagement with said clips, and means for connecting said contact arms to a source of electric current, whereby said heating unit may be energized at will, and will be completely disconnected from the source of current when not in use.

4. In an electric cigar lighter, a casing having a top opening, a heating unit, and means in said casing for holding said unit in a position projecting through said opening, comprising a central vertical wall member engaging the lower end of said heating unit, a vertical cross piece engaged in a central slot in said wall member, and a horizontal disk secured in said outer casing and engaging the lower end of said cross piece.

5. The invention as defined in claim 4, in which said unit holding means comprises an insulator in said top opening, said insulator having a central aperture in which a central portion of said heating unit is fitted.

6. The invention as defined in claim 4, including a pair of spring clips embracing the lower end of said heating unit, said clips having integral lugs projecting downwardly at opposite sides of said cross piece and secured to opposite edge portions of said vertical wall member, resilient contact arms mounted in said vertical wall member at opposite sides of said cross piece, and means for swinging said arms into engagement with said lugs.

7. In an electric cigar lighter, a heating unit comprising a block of heat-resistant insulating material and a coating of electrically resistive and conductive material extending over an upper portion of said block, said coating terminating on opposite lower side portions of said block, and means for holding said heating unit comprising a casing having a top opening provided with an inner seat, an insulator engaged with said seat and having a central aperture embracing a mid-portion of said heating unit, a pair of electrically conductive spring clips insulated from each other and gripping said block upon the end portions of said coating below said central aperture, and means supporting said spring clips and holding said insulator against said seat, whereby said heating unit and said insulator may be held assembled with said casing.

8. The invention as defined in claim 7, wherein said heating unit and said central aperture are tapered so as to converge upwardly, and wherein said spring clip supporting means is engaged with the lower end of said heating unit, whereby said heating unit may be firmly held by said central aperture.

9. In an electric cigar lighter, a heating unit, means for supporting said unit and providing an electric circuit therethrough comprising a vertical wall of insulating material carrying a pair of laterally spaced contact lugs connected to said heating unit, a pair of laterally spaced spring contact arms adapted to engage said contact lugs, a vertical crosspiece of insulating material disposed at right angles to said vertical wall and extending between said contact arms, and a vertically-slotted push button slidably embracing an edge-portion of said vertical cross piece and engaging said contact arms at opposite sides of said cross piece for pressing said arms against said lugs.

JOSEPH J. DANTE.

REFERENCES CITED

The following references are of record in the file of this patent:

UNITED STATES PATENTS

| Number | Name | Date |
|---|---|---|
| 516,878 | Sachs | Mar. 20, 1894 |
| 1,253,575 | Clark | Jan. 15, 1918 |
| 1,525,624 | Suter | Feb. 10, 1925 |
| 1,573,925 | Franke et al. | Feb. 23, 1926 |
| 1,665,792 | Parker | Apr. 10, 1928 |
| 1,676,745 | Pickard | July 10, 1928 |
| 1,694,256 | Gebel | Dec. 4, 1928 |
| 1,819,610 | Lucia | Aug. 18, 1931 |
| 1,844,206 | Copeland | Feb. 9, 1932 |
| 1,978,323 | Power | Oct. 23, 1934 |